(12) United States Patent
Wooten et al.

(10) Patent No.: US 9,327,685 B1
(45) Date of Patent: May 3, 2016

(54) WIRELESS VEHICLE ANTI-THEFT SURVEILLANCE SYSTEM

(71) Applicants: Ronald Wooten, Virginia Beach, VA (US); Donald G Wooten, Virginia Beach, VA (US)

(72) Inventors: Ronald Wooten, Virginia Beach, VA (US); Donald G Wooten, Virginia Beach, VA (US)

(*) Notice: Subject to any disclaimer, the term of this patent is extended or adjusted under 35 U.S.C. 154(b) by 288 days.

(21) Appl. No.: 13/968,799

(22) Filed: Aug. 16, 2013

Related U.S. Application Data

(60) Provisional application No. 61/683,873, filed on Aug. 16, 2012.

(51) Int. Cl.
*B60R 25/00* (2013.01)
*B60R 25/30* (2013.01)
(52) U.S. Cl.
CPC .................................. *B60R 25/305* (2013.01)
(58) Field of Classification Search
CPC .................................................. B60R 25/305
USPC .......................................................... 348/152
See application file for complete search history.

(56) References Cited

U.S. PATENT DOCUMENTS

| | | | |
|---|---|---|---|
| 4,420,238 A | 12/1983 | Felix | |
| 4,789,904 A | 12/1988 | Peterson | |
| 5,027,104 A | 6/1991 | Reid | |
| 6,002,326 A | 12/1999 | Turner | |
| 6,333,759 B1 | 12/2001 | Mazzilli | |
| 2002/0011927 A1* | 1/2002 | Lang et al. | 340/436 |
| 2003/0021490 A1* | 1/2003 | Okamoto et al. | 382/284 |
| 2003/0067541 A1* | 4/2003 | Joao | 348/148 |
| 2005/0174218 A1* | 8/2005 | Jordan et al. | 340/426.1 |
| 2008/0204556 A1* | 8/2008 | de Miranda et al. | 348/148 |
| 2010/0327766 A1* | 12/2010 | Recker et al. | 315/291 |
| 2013/0182065 A1 | 7/2013 | Chen | |

* cited by examiner

*Primary Examiner* — Sath V Perungavoor
*Assistant Examiner* — Jeffery Williams
(74) *Attorney, Agent, or Firm* — RG Patent Consulting, LLC; Rachel Gilboy (57) ABSTRACT

A vehicle anti-theft system to sense the presence of an intruder in proximity to a vehicle via motion sensors which activates one or more cameras and sends real-time video to a remote location accessible by a user to monitor their vehicle.

1 Claim, 5 Drawing Sheets

WIRELESS VEHICLE ANTI-THEFT SURVEILLANCE SYSTEM

CROSS-REFERENCE TO RELATED APPLICATION

The present application is related to and claims priority from prior provisional application Ser. No. 61/683,873, filed Aug. 16, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of anti-theft systems and more specifically relates to a wireless vehicle anti-theft surveillance system.

2. Description of the Related Art

Motor vehicle theft, sometimes referred to as grand theft auto by the media and police departments in the United States, is the criminal act of stealing or attempting to steal a motor vehicle. Nationwide in the United States in 2005, there were an estimated 1.2 million motor vehicle thefts, or approximately 416.7 motor vehicles stolen for every 100,000 inhabitants. Property losses due to motor vehicle theft in 2005 were estimated at $7.6 billion. Since then the number of motor vehicle thefts nationally has declined. Even with this decline, the most recent statistics, for 2009, show an estimated 794,616 thefts of motor vehicles nationwide representing property losses of nearly $5.2 billion. The inconvenience and cost caused by such theft events is significant.

Some methods used by criminals to steal motor vehicles include theft of an unattended vehicle without keys, theft with access to keys, opportunistic theft, carjacking, and fraudulent theft. The common tools used by criminals to steal vehicles include a slide hammer puller to break into the door locks and the cylinder lock, multimeters or a test light to find a power source, spare wires and/or a screwdriver to connect the power source to the ignition and starter wires, a generic rod and hook to slip between the car window and the car frame, and firearms or other weapons such as a baseball bat to break open a window. The common denominator of all of these methods is that an intruder must approach the vehicle and be in close proximity to the vehicle in order to complete the theft.

Several methods of deterrent have been developed including devices to lock a vehicle part necessary for operation of a vehicle such as a steering wheel, immobilizers which allow the vehicle to start only if a key containing the correct chip is present in the ignition, and other deterrents such as car alarm systems, kill switches, signage on windows warning of the presence of deterrents and VIN etching in windows and the like. Many of these means may be ineffective, cumbersome and/or expensive. A cost-effective solution is desirable.

Various attempts have been made to solve the above-mentioned problems such as those found in U.S. Pat. No. 6,002, 326 to Valerie Jean Turner, U.S. Pat. No. 4,789,904 to Roger D. Peterson, U.S. Pat. No. 5,027,104 to Donald J. Reid, U.S. Pat. No. 6,333,759 to Joseph J. Mazzilli, U.S. Pat. No. 4,420, 238 to Larry L. Felix, and U.S. Pub. No. 2013/0182065 to Shih-Yao Chen. This art is representative of anti-theft systems. None of the above inventions and patents, taken either singly or in combination, is seen to describe the invention as claimed.

Ideally, a wireless vehicle anti-theft surveillance system should provide the ability to sense movement around a vehicle within a predetermined area via a plurality of (semi-concealed) sensors which activates one or more cameras to record the activity and wirelessly transmit visual images of the activity in real time to a remote monitor and, yet would operate reliably and be manufactured at a modest expense. Thus, a need exists for a reliable wireless vehicle anti-theft surveillance system to avoid the above-mentioned problems.

BRIEF SUMMARY OF THE INVENTION

In view of the foregoing disadvantages inherent in the known anti-theft art, the present invention provides a novel wireless vehicle anti-theft surveillance system. The general purpose of the present invention, which will be described subsequently in greater detail is to provide a vehicle anti-theft system to sense the presence of an intruder in proximity to a vehicle which activates one or more cameras and sends real-time video to a remote location accessible by a user to monitor their vehicle.

A wireless vehicle anti-theft surveillance system is disclosed herein, in a preferred embodiment, comprising in combination an anti-theft-surveillance-assembly, a wireless-transmitter, and a wireless-data-bank. The anti-theft-surveillance-assembly preferably comprises in combination a first-sensor, a second-sensor, a third-sensor, a fourth-sensor, a fifth-sensor, a first-camera, a second-camera, a third-camera, a fourth-camera, and a fifth-camera.

The first-sensor, second-sensor, third-sensor, fourth-sensor, and fifth-sensor each comprise a monitoring-range of up to 180 degrees, with each of the sensors comprising a motion sensor via motion sensing means. The sensors are preferably mounted on a vehicle in the following manner. The first-sensor is mounted on a driver-mirror of a vehicle. The second-sensor is mounted on a front-grill of the vehicle. The third-sensor is mounted on a passenger-mirror of the vehicle (when present). The fourth-sensor is mounted on a rear-panel of the vehicle, and the fifth-sensor is mounted on a rearview-mirror inside the vehicle. At least one of the first-sensor, the second-sensor, the third-sensor, the fourth-sensor, and the fifth-sensor are activated when an intruder approaches within a set-distance of the vehicle. The device may be programmed to make pre-set visual sweeps or may be operated remotely by the user via a controlling means on a laptop or smart phone.

When at least one of the first-sensor, the second-second, the third-sensor, the fourth-sensor, and the fifth-sensor is/are activated it/they in turn activate at least one of the first-camera, the second camera, the third-camera, the fourth-camera, and the fifth-camera to begin recording a visual-recording of movement around the vehicle, with an onboard power source providing power to the anti-theft-surveillance-assembly. The first-camera, the second-camera, the third-camera, the fourth-camera, and the fifth-camera each comprise a viewing-range of up to 180 degrees.

The cameras are preferably mounted on a vehicle in the following manner. The first camera is mounted on the driver-mirror of the vehicle. The second-camera is mounted on the front-grill of the vehicle. The third-camera is mounted on the passenger-mirror of the vehicle. The fourth-camera is mounted on the rear-panel of the vehicle, and the fifth-camera is mounted on the rearview-mirror inside the vehicle. The sensor(s) and camera(s) may be combined as assemblies for example first sensor and first camera within a single assembly. In certain embodiments cameras are located on the inside of the vehicle on a frame. A camera will be trained on the driver's seat (occupant) such that the camera will capture a driver and anyone sitting behind the driver's seat. Another camera may be used in a similar manner on the passenger side. The cameras will also be in the rear of the vehicle, in a similar way on the frame (but) pointing forward catching the driver seat vicinity and passenger's seat as well; this way the vehicle will have that 360 degrees of video surveillance and visual coverage inside. These cameras will be mounted on the driver side and passenger side, and they will be mounted in the rear of the car the same way as the front (but opposing).

The wireless-transmitter is located inside the vehicle and may use an RF-signal to transmit a visual-recording video over a pre-determined frequency to a wireless-data-bank. Other technology and means may be used for wireless transmission. The wireless-data-bank may be located on a remote-device comprising a computer which is in communication with the wire-less-transmitter. The computer is located to be accessible by a user providing remote-monitoring capability to the user.

When in use the anti-theft-surveillance-assembly is placed in an on-mode when the ignition of the vehicle is turned off. Activation is delayed in order for the user to depart the vehicle such that the first-sensor, the second-sensor, the third-sensor, the fourth-sensor, and the fifth-sensor are armed and able to sense movement of an intruder within a set-distance of the vehicle and reactively activate at least one of the first-camera, the second-camera, the third-camera, the fourth-camera, and the fifth-camera to send a visual-recording of the intruder to the wireless-data-bank via the wireless-transmitter (if/when activated by movement), thereby allowing the user to remotely monitor the vehicle. The present invention provides a means by which a user may reliably monitor his/her vehicle remotely.

A kit is included for the wireless vehicle anti-theft surveillance system including a first-sensor, a second-sensor, a third-sensor, a fourth-sensor, a fifth-sensor, a first-camera, a second-camera, a third-camera, a fourth-camera, a fifth-camera, a wireless-transmitter, an optional wireless-data-bank, and at least one set of user-instructions. The device may be retro-fit to existing vehicles or be offered OEM. A method of use for the wireless vehicle anti-theft surveillance system is also disclosed herein.

The present invention holds significant improvements and serves as a wireless vehicle anti-theft surveillance system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, wireless vehicle anti-theft surveillance system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an anti-theft system and more particularly to a wireless vehicle anti-theft surveillance system as used to improve the ability to sense (and record) the presence of an intruder in proximity to a vehicle via motion sensors which activates one or more cameras and sends real-time video to a remote location accessible by a user to monitor their vehicle.

Generally speaking, many vehicle owners are concerned about the security of their vehicles when they are parked in a parking lot, on the street, and in their driveway or garage. Aware of the threat of vehicle theft they desire to have protection for their vehicles to avoid financial loss and the inconveniences of having to report a stolen vehicle to police and insurance carriers and the need to replace the vehicle either temporarily or permanently. Realizing that many anti-theft devices do not provide the level of coverage they desire, a wireless vehicle anti-theft surveillance system as the one described herein will provide them relief from worry about their parked vehicle and the distress imposed on them when their vehicle might be stolen.

Figure 1:
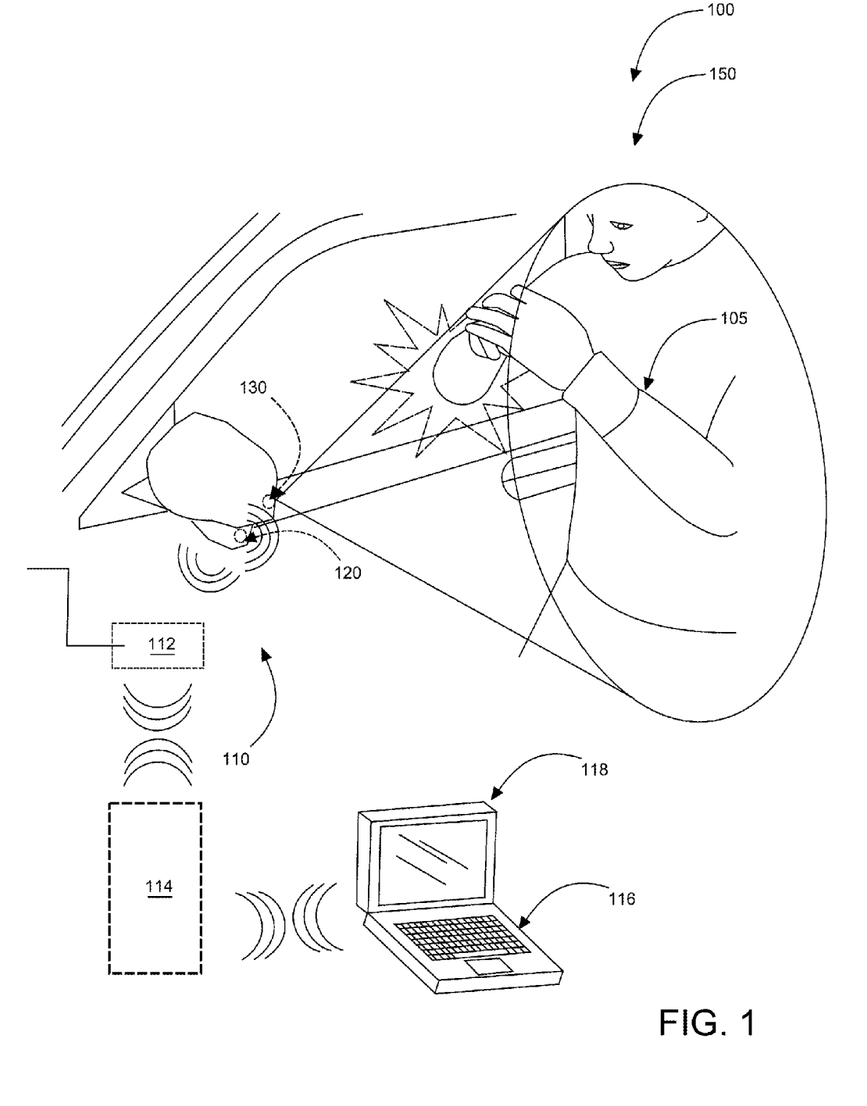
FIG. 1 shows a perspective view illustrating a wireless vehicle anti-theft surveillance system in an armed in-use condition according to an embodiment of the present invention.

Referring to the drawings by numerals of reference there is shown in FIG. 1, a perspective view illustrating wireless vehicle anti-theft surveillance system 100 in an armed in-use condition according to an embodiment of the present invention.

Wireless vehicle anti-theft surveillance system 100 comprises in combination anti-theft-surveillance-assembly 110, wireless-transmitter 112, and wireless-data-bank 114. Anti-theft-surveillance-assembly 110 comprises in combination first-sensor 120, second-sensor 122, third-sensor 124, fourth-sensor 126, fifth-sensor 128, first-camera 130, second-camera 132, third-camera 134, fourth-camera 136, and fifth-camera 138 in preferred embodiments. First-sensor 120, second-sensor 122, third-sensor 124, fourth-sensor 126, and fifth-sensor 128 each comprise a monitoring-range of up to 180 degrees, with each of the sensors comprising a motion sensor. In this way the present invention may completely monitor an exterior and interior of vehicle 160. In certain embodiments sensors may generally comprise motion activated versions of sensors. Other embodiments may comprise heat sensitive or other sensing means to activate and track a perpetrator.

When at least one of first-sensor 120, second-second 122, third-sensor 124, fourth-sensor 126, and fifth-sensor 128 are activated they in turn activate at least one of first-camera 130, second camera 132, third-camera 134, fourth-camera 136, and fifth-camera 138 to begin recording a visual-recording of movement around vehicle 160, with an onboard power source providing power to anti-theft-surveillance-assembly 110. First-camera 130, second-camera 132, third-camera 134, fourth-camera 136, and fifth-camera 138 each comprise a viewing-range of up to 180 degrees. In this way the present invention may completely record footage from an exterior and interior of vehicle 160.

Figure 2:
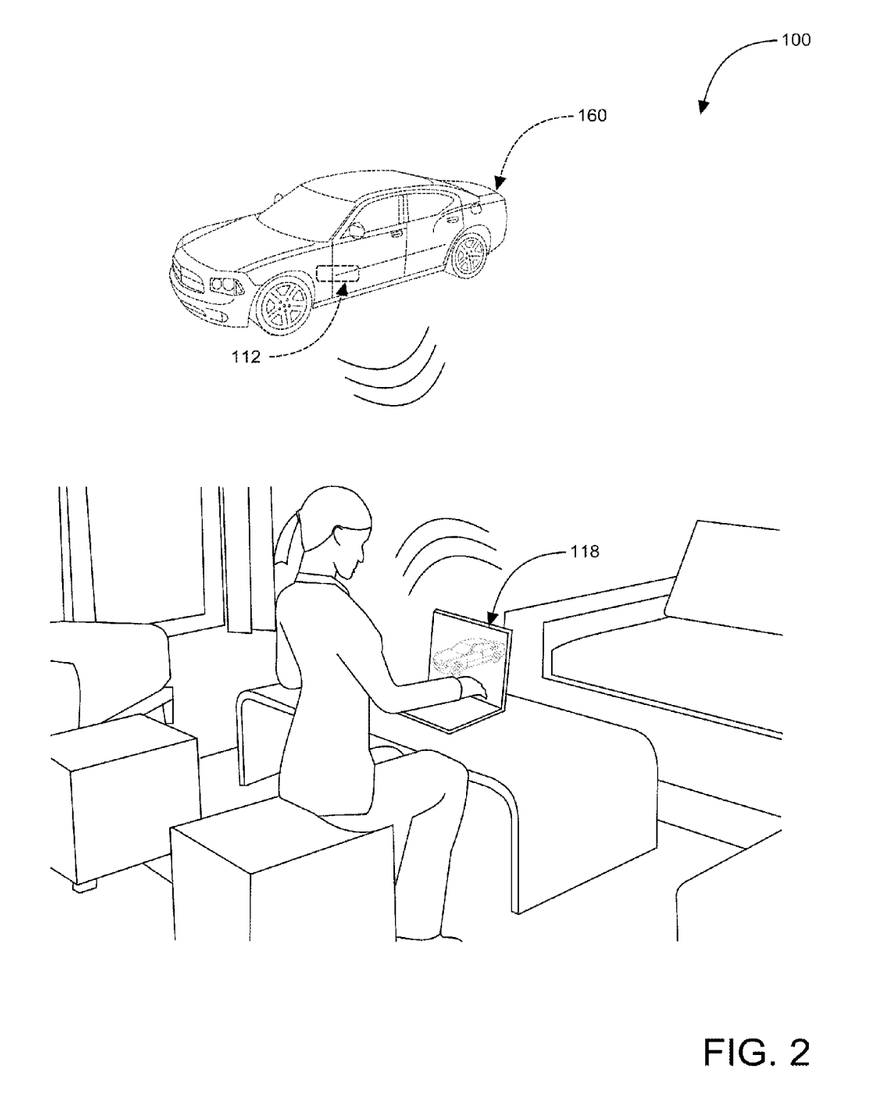
FIG. 2 is a perspective view illustrating a vehicle with mounted cameras and sensors of an anti-theft-surveillance-assembly that is being remotely monitored according to an embodiment of the present invention of FIG. 1.

Wireless-transmitter 112 may be located inside vehicle 160 and uses an RF-signal in certain embodiments to transmit a visual-recording video over a pre-determined frequency to wireless-data-bank 114. Wireless-data-bank 114 is located remotely on a server or on remote-device 116 comprising computer 118 which is in communication with wire-less-transmitter 112. Computer 118 is located to be accessible by a user providing remote-monitoring capability to the user, as shown in FIG. 2. In an alternate embodiment, wireless-transmitter 112 is in communication with a remote-device 116 comprising a handheld device such as a wireless cellular phone (smart phone or the like) such that a user is able to view the video received from wireless-transmitter 112.

When in use anti-theft-surveillance-assembly 110 is placed in an on-mode when the ignition of vehicle 160 is turned off. Activation is delayed in order for the user to depart vehicle 160 such that first-sensor 120, second-sensor 122, third-sensor 124, fourth-sensor 126, and fifth-sensor 128 are armed and able to sense movement of intruder 105 within a set-distance of vehicle 160 and reactively activate at least one of first-camera 130, second-camera 132, third-camera 134, fourth-camera 136, and fifth-camera 138 to send a visual-recording of intruder 105 to wireless-data-bank 114 via wireless-transmitter 112, thereby allowing the user to remotely monitor vehicle 160. First-sensor 120, second-sensor 122, third-sensor 124, fourth-sensor 126, and fifth-sensor 128 may also be set to not activate when a keyfob or the like is within a proximate area. Thus a keyfob in communication with first-sensor 120, second-sensor 122, third-sensor 124, fourth-sensor 126, and fifth-sensor 128 may be used to differentiate between the owner and a prospective perpetrator. Those with ordinary skill in the art will now appreciate that upon reading this specification and by their understanding the art of sensing means as described herein, methods of detection will be understood by those knowledgeable in such art.

Referring now to FIG. 2, a perspective view illustrating vehicle 160 with mounted cameras and sensors of an anti-theft-surveillance-assembly 110 that is being remotely monitored according to an embodiment of the present invention of FIG. 1.

The sensors are preferably mounted on a vehicle in the following manner. First-sensor 120 is mounted on driver-mirror 162 of vehicle 160. Second-sensor 122 is mounted on front-grill 164 of vehicle 160. Third-sensor 124 is mounted on a passenger-mirror 166 of vehicle 160 (when available or may be positioned alternately on another suitable mounting point on a passenger side of vehicle 160). Fourth-sensor 126 is mounted on rear-panel 168 of the vehicle 160, and fifth-sensor 128 is mounted on rearview-mirror 170 inside vehicle 160. At least one of first-sensor 120, second-sensor 122, third-sensor 124, fourth-sensor 126, and fifth-sensor 128 are activated when an intruder approaches within a set-distance of vehicle 160, as indicated in FIG. 1.

The cameras are preferably mounted on vehicle 160 in the following manner (corresponding to positioning of first-sensor 120, second-sensor 122, third-sensor 124, fourth-sensor 126, and fifth-sensor 128). First camera 130 is mounted on driver-mirror 162 of vehicle 160. Second-camera 132 is mounted on front-grill 164 of vehicle 160. Third-camera 134 is mounted on passenger-mirror 166 of vehicle 160. Fourth-camera 136 is mounted on rear-panel 168 of vehicle 160, and fifth-camera 138 is mounted on rearview-mirror 170 inside vehicle 160. Assemblies of sensor/cameras may be used, as shown and may be retro-fit or offered OEM by vehicle manufacturers. Those with ordinary skill in the art will now appreciate that upon reading this specification and by their understanding the art of sensors, cameras, housings (as assemblies), and onboard wiring of vehicles, and wireless communication as described herein, methods of manufacturing and communication of the system described herein will be understood by those knowledgeable in such art.

Figure 3:
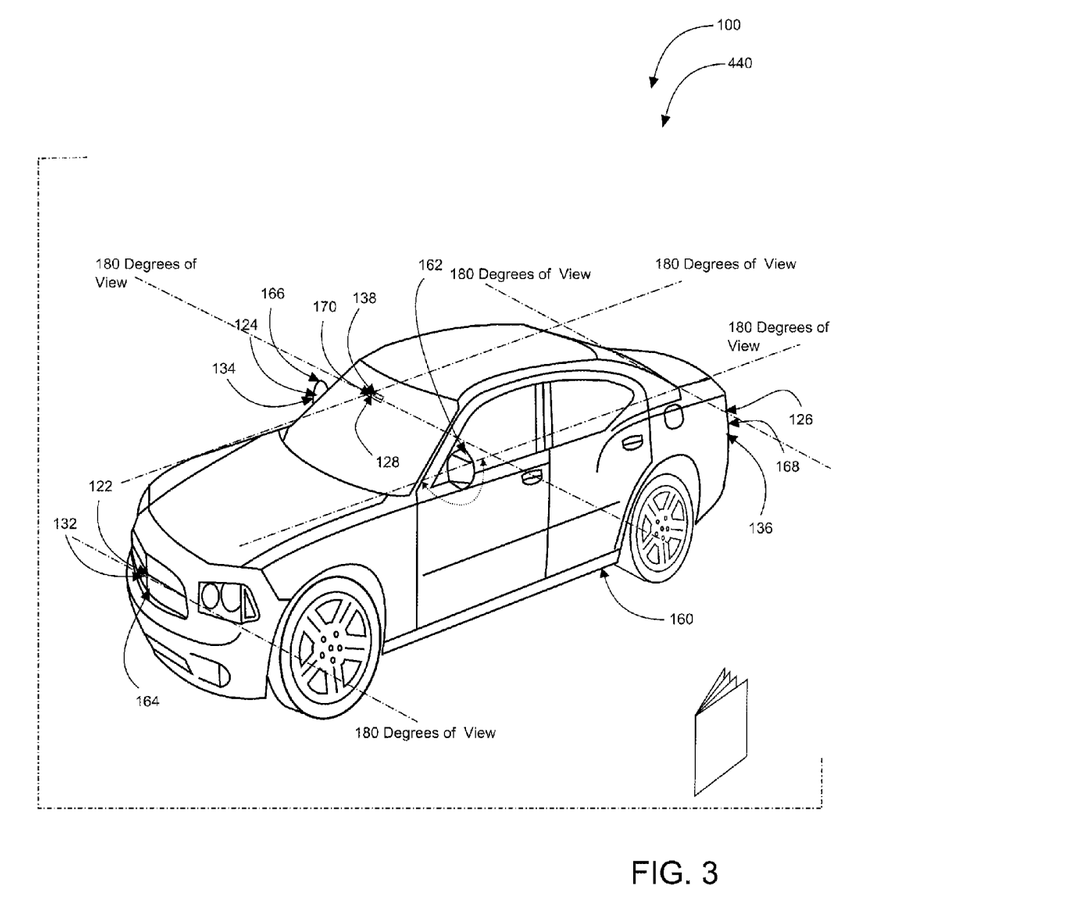
FIG. 3 is a perspective view illustrating the wireless vehicle anti-theft surveillance system including a vehicle driver-mirror with a first-camera and first-sensor according to an embodiment of the present invention of FIG. 1.

Referring now to FIG. 3, a perspective view illustrating the wireless vehicle anti-theft surveillance system 100 including driver-mirror 162 of vehicle 160 with first-camera 130 and first-sensor 120 according to an embodiment of the present invention of FIG. 1.

First-sensor 120 and first-camera 130 are preferably mounted on driver-mirror 162 such that when intruder 105 approaches vehicle 160 within the monitoring-range of first-sensor 120, first-sensor 120 is activated and in turn activates first-camera 130 and wireless-transmitter 112 sends a real-time video to remote-device 116 such that a user is able to view activity at vehicle 160, as shown in FIG. 1. First-sensor 120 and first-camera 130 are able to work collaboratively in combination, as are the other sensors and cameras within the present system.

Figure 4:
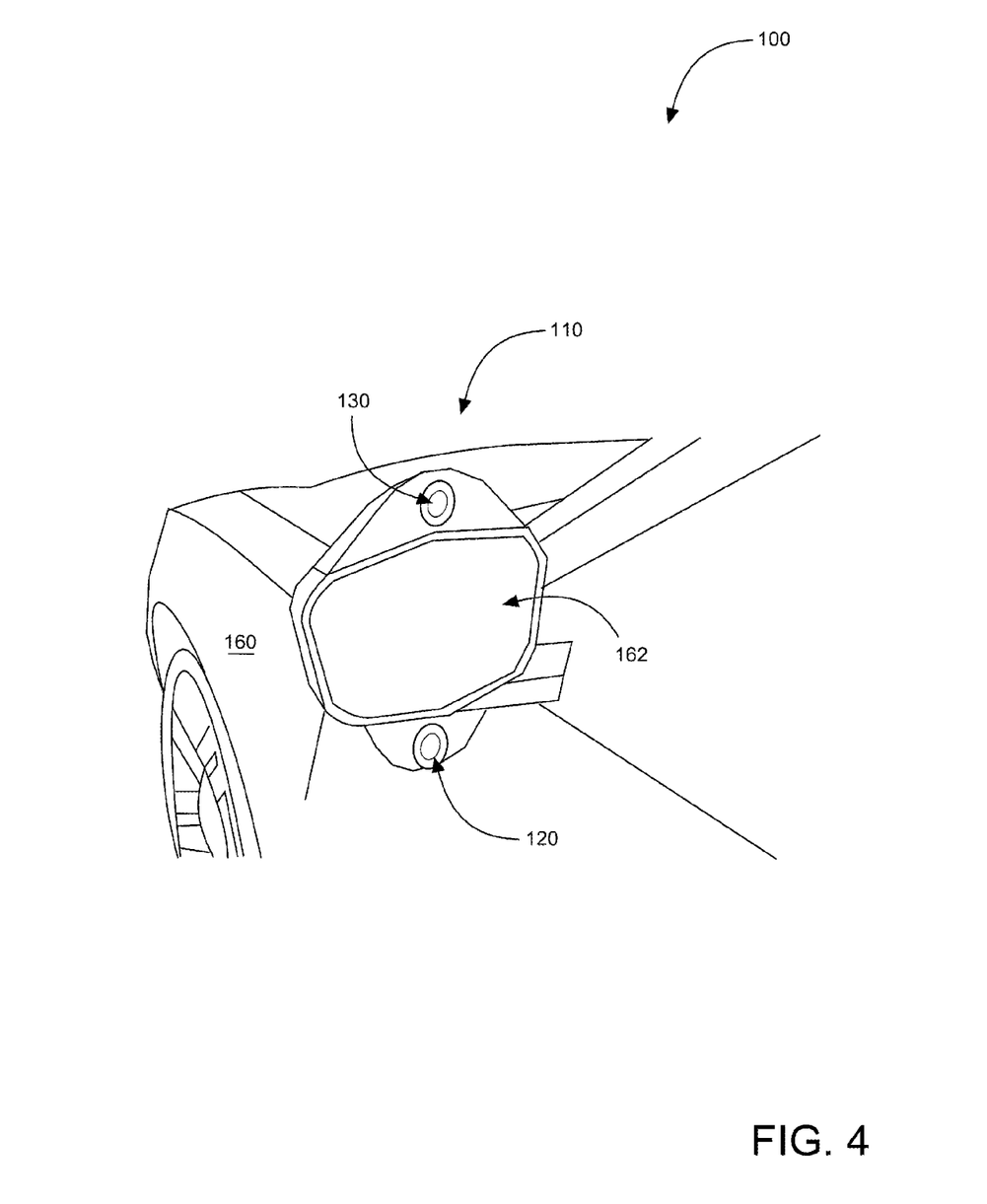
FIG. 4 is a perspective view illustrating a vehicle driver-mirror with a first-camera and first-sensor according to an embodiment of the present invention of FIG. 1.
Figure 5:
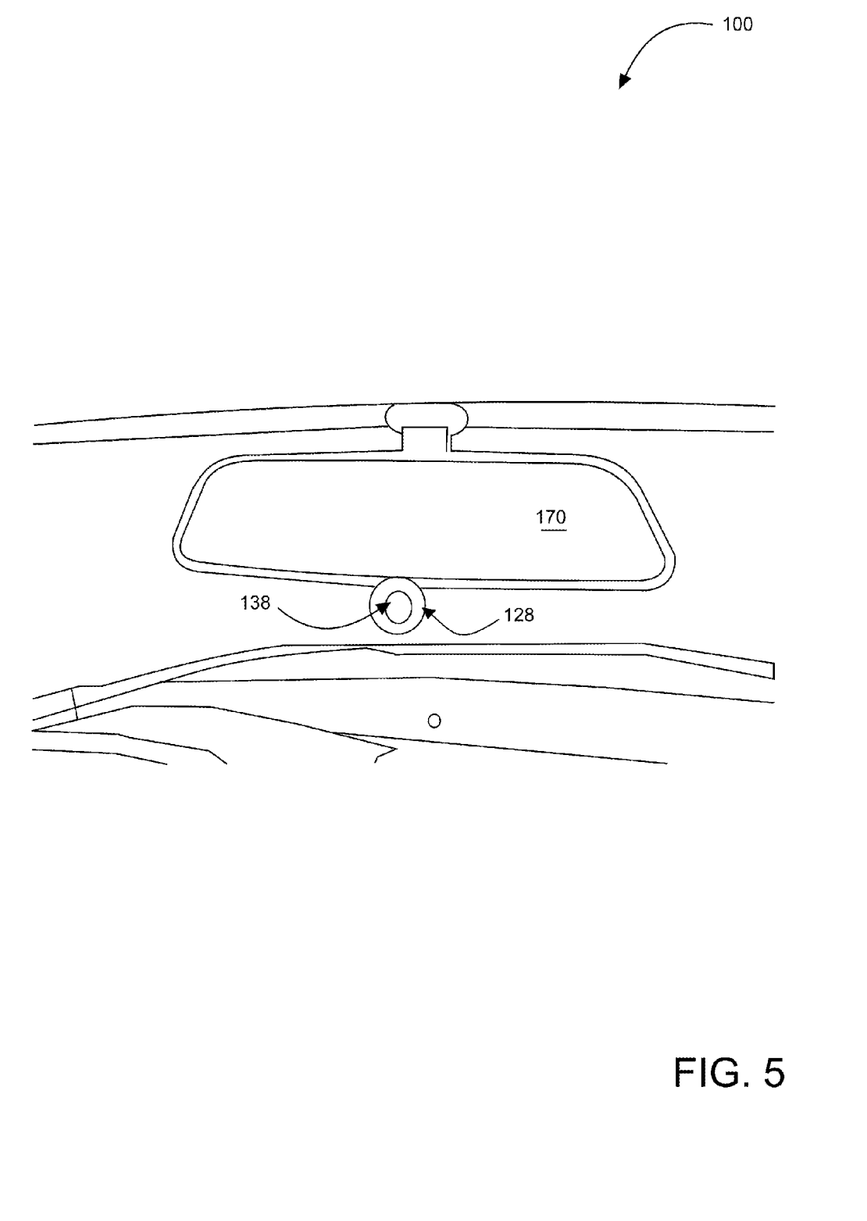
FIG. 5 is a perspective view illustrating a vehicle rear-view mirror with a fifth-camera and fifth-sensor according to an embodiment of the present invention of FIG. 1.

Referring now to FIGS. 4 and 5; FIG. 4 a close-up perspective view illustrating driver-mirror 162 of vehicle 160 with first-camera 130 and first-sensor 120; FIG. 5, a perspective view illustrating a vehicle rear-view mirror with a fifth-camera and fifth-sensor both figures according to an embodiment of the present invention of FIG. 1.

Fifth-sensor 128 and fifth-camera 130 are preferably mounted on rear-view mirror 170 such that when intruder 105 enters vehicle 160, fifth-sensor 128 is activated and in turn activates fifth-camera 138 and wireless-transmitter 112 sends a real-time video to remote-device 116 such that a user is able to view activity at vehicle 160.

Wireless vehicle anti-theft surveillance system 100 may be sold as kit 440 (retrofit) comprising the following parts: at least one first-sensor 120 at least one second-sensor 122; at least one third-sensor 124; at least one fourth-sensor 126; at least one fifth-sensor 128; at least one first-camera 130 at least one second-camera 132; at least one third-camera 134; at least one fourth-camera 136; at least one fifth-camera 138; at least one wireless-transmitter 112, necessary electrical wiring; at least one optional wireless-data-bank 114 (service may be provided for remotely), and at least one set of user-instructions for installation, maintenance and use. The kit has instructions such that functional relationships are detailed in relation to the structure of the invention (such that the invention can be used, maintained, or the like in a preferred manner). Wireless vehicle anti-theft surveillance system 100 may be manufactured and provided for sale in a wide variety of sizes and shapes for a wide assortment of applications. OEM applications are also contemplated. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different camera/sensor/receiver/transceiver combinations, parts may be sold separately, etc., may be sufficient.

Method of use for wireless vehicle anti-theft surveillance system 100 preferably the steps of: step one turning off ignition of vehicle 160; step two departing vehicle 160 (while system is arming); and step three monitoring wireless vehicle anti-theft surveillance system 100 from a remote location.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A wireless vehicle anti-theft surveillance system comprising:
   an anti-theft-surveillance-assembly comprising:
      a first-sensor;
      a second-sensor;
      a third-sensor;
      a fourth-sensor; and
      a fifth-sensor;
      a first-camera;
      a second-camera;
      a third-camera;
      a fourth-camera; and
      a fifth-camera;
   a wireless-transmitter; and
   a wireless-data-bank;
   wherein said wireless vehicle anti-theft surveillance system comprises in combination said anti-theft-surveillance-assembly, said wireless-transmitter, and said wireless-data-bank;
   wherein said anti-theft-surveillance-assembly comprises in combination said first-sensor, said second-sensor, third-sensor, said fourth-sensor, said fifth-sensor, said first-camera, said second-camera, said third-camera, said fourth-camera; and said fifth-camera all in communication within said anti-theft-surveillance-assembly;
   wherein said first-sensor, said second-sensor, said third-sensor, said fourth-sensor, and said fifth-sensor each comprise a monitoring-range of up to 180 degrees;
   wherein said first-sensor, said second-sensor, said third-sensor, said fourth-sensor and said fifth-sensor each comprise at least one motion sensor;
   wherein said first-sensor is mounted on a driver-mirror of said vehicle;
   wherein said second-sensor is mounted on a front-grill of said vehicle;
   wherein said third-sensor is mounted on a passenger-mirror of said vehicle;
   wherein said fourth-sensor is mounted on a rear-panel of said vehicle;
   wherein said fifth-sensor is mounted on a rearview-mirror inside said vehicle;
   wherein at least one of said first-sensor, said second-sensor, said third-sensor, said fourth-sensor, and said fifth-sensor are activated when an intruder approaches within a set-distance of said vehicle;
   wherein when at least one of said first-sensor, said second-second, said third-sensor, said fourth-sensor, and said fifth-sensor are activated, they in turn activate at least one of said first-camera, said second camera, said third-camera, said fourth-camera, and said fifth-camera to begin recording a visual-recording of movement around said vehicle, an onboard power source providing power to said anti-theft-surveillance-assembly;
   wherein said first-camera, said second-camera, said third-camera, said fourth-camera, and said fifth-camera each comprise a viewing-range of up to 180 degrees;
   wherein said first camera is mounted on said driver-mirror of said vehicle;
   wherein said second-camera is mounted on said front-grill of said vehicle;
   wherein said third-camera is mounted on said passenger-mirror of said vehicle;
   wherein said fourth-camera is mounted on said rear-panel of said vehicle;
   wherein said fifth-camera is mounted on said rearview-mirror inside said vehicle;
   wherein said wireless-transmitter is located inside said vehicle;
   wherein said wireless-transmitter uses an RF-signal;
   wherein said wireless-transmitter transmits video data over a pre-determined frequency;
   wherein said wireless-data-bank is located on a remote-device;
   wherein said visual-recording is wirelessly transmitted via said wireless-transmitter to said wireless-data-bank;
   wherein said wireless-data-bank is in communication with a computer located to be accessible by said user providing remote-monitoring capability;
   wherein said anti-theft-surveillance-assembly is placed in an on-mode when ignition of said vehicle is turned off; and
   wherein a user is able to activate said anti-theft-surveillance-assembly when turning off said ignition and departing said vehicle such that said first-sensor, said second-sensor, said third-sensor, said fourth-sensor, and said fifth-sensor are armed and able to sense movement of said intruder within said set-distance of said vehicle and reactively activate at least one of said first-camera, said second-camera, said third-camera, said fourth-camera, and said fifth-camera, said at least one of said first-camera, said second-camera, said third-camera, said fourth-camera, and said fifth-camera able to be programmed for intermittent visual sweeps and to send said visual-recording of said intruder to said wireless-databank via said wireless-transmitter, thereby allowing said user to remotely monitor said vehicle.

* * * * *